INVENTORS
J. O. HAMILTON
L. J. ROZANKOWSKI
BY
ATTORNEY

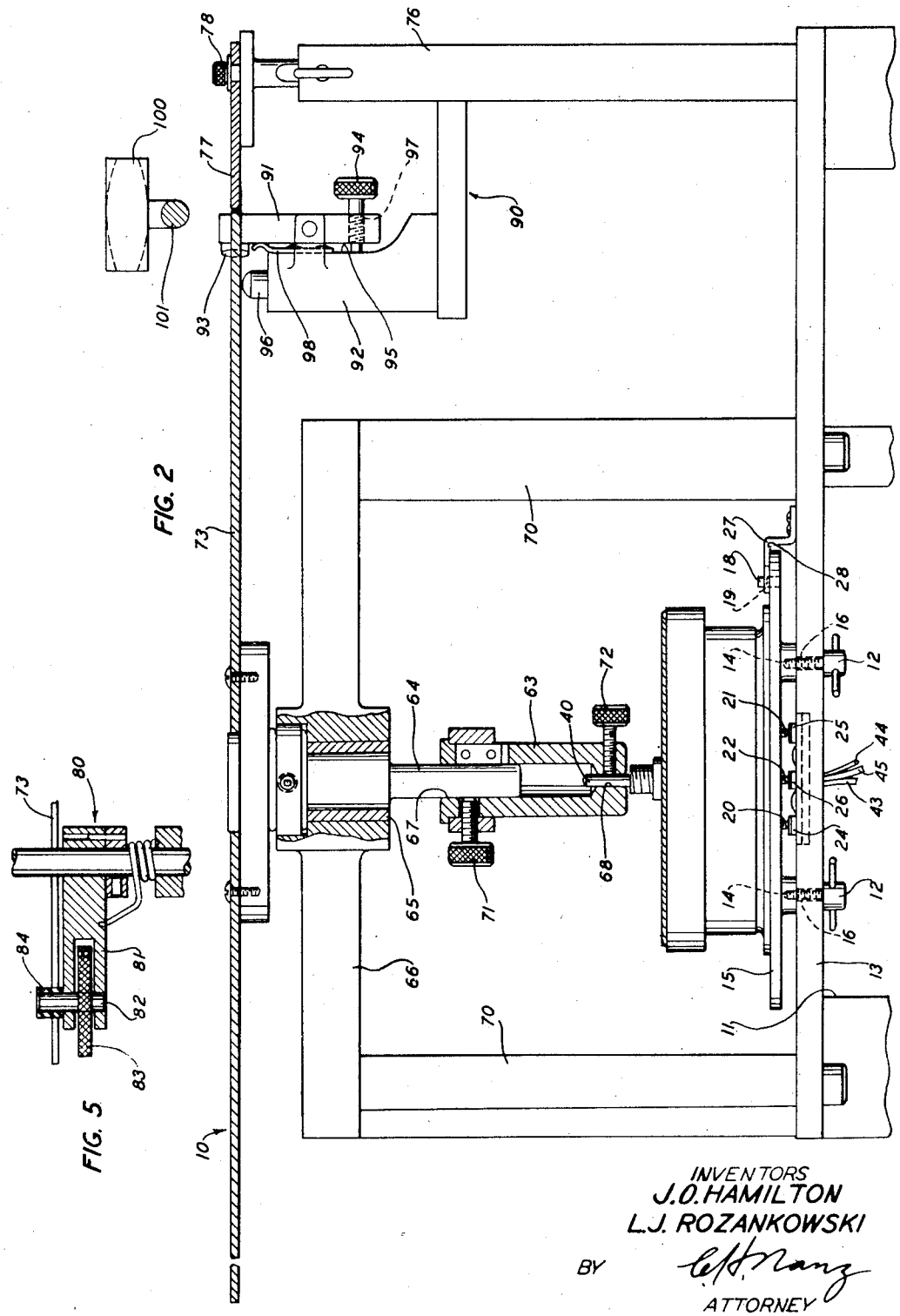

May 10, 1949. J. O. HAMILTON ET AL 2,469,465
APPARATUS FOR TESTING ADJUSTABLE RESISTANCES
Filed July 20, 1945 4 Sheets-Sheet 3
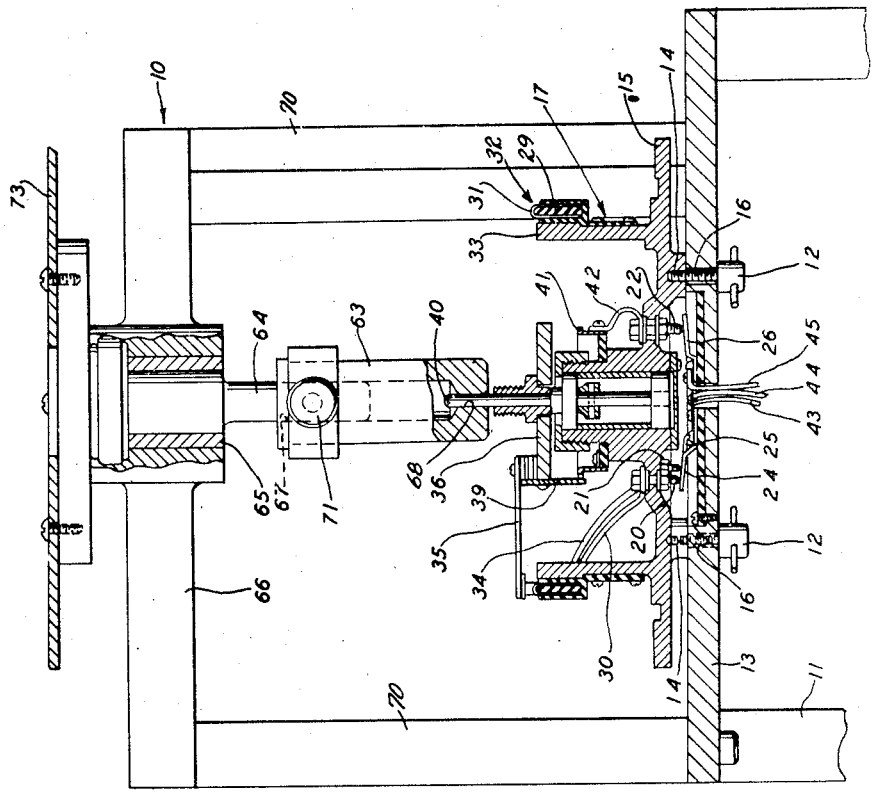
INVENTORS
J.O. HAMILTON
L.J. ROZANKOWSKI
BY
ATTORNEY May 10, 1949.   J. O. HAMILTON ET AL   2,469,465
APPARATUS FOR TESTING ADJUSTABLE RESISTANCES
Filed July 20, 1945   4 Sheets-Sheet 4
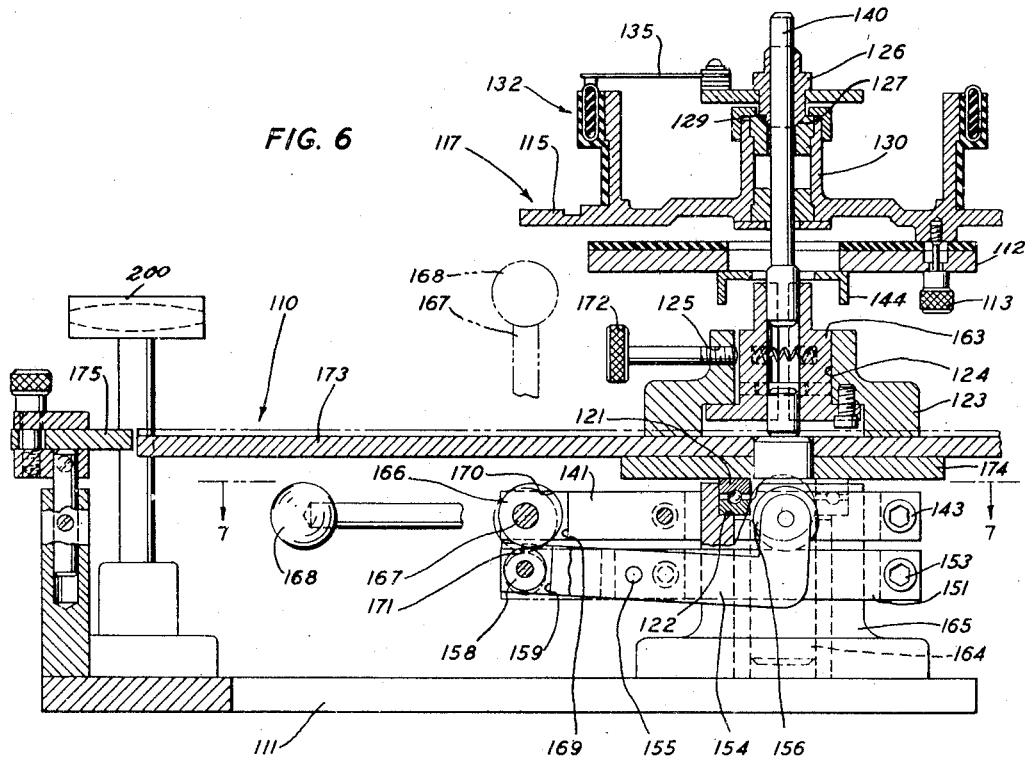
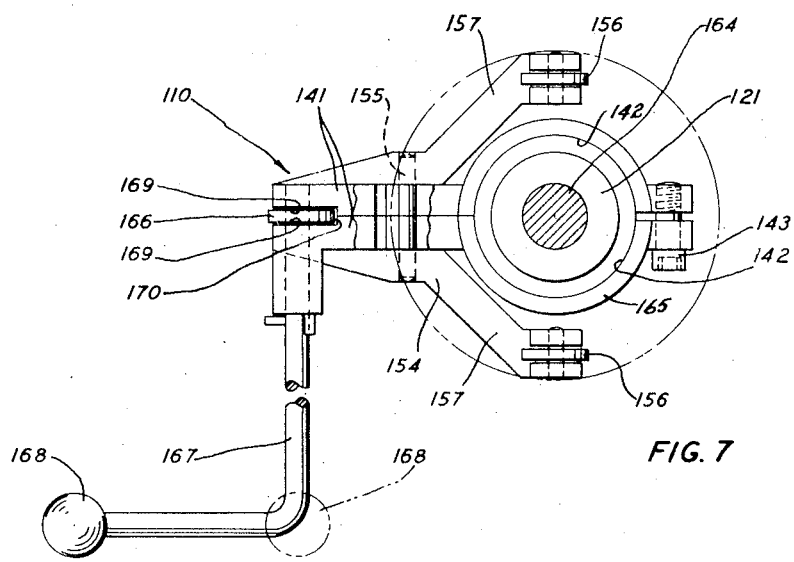
INVENTORS
J. O. HAMILTON
L. J. ROZANKOWSKI
BY
ATTORNEY Patented May 10, 1949

2,469,465

UNITED STATES PATENT OFFICE 2,469,465

APPARATUS FOR TESTING ADJUSTABLE RESISTANCES

James O. Hamilton, Dundalk, and Leon J. Rozankowski, Baltimore, Md., assignors to Western Electric Company, Incorporated, New York, N. Y., a corporation of New York Application July 20, 1945, Serial No. 606,216

8 Claims. (Cl. 175—183)

This invention relates to apparatus for testing articles, and more particularly it relates to apparatus for testing the ratios of resistances of potentiometer cards.

In the manufacture of potentiometers of a type which includes an annular potentiometer card, a rotatable shaft mounted concentrically with respect to the potentiometer card, a brush assembly connected to the shaft for contacting the potentiometer card and a dial having a scale formed thereon which is designed to be fastened to the shaft for rotation therewith to determine the position of the brush assembly with respect to the potentiometer card, it is desirable to check the ratios of resistances of the potentiometer card after it has been assembled in the potentiometer but before the dial is secured to the shaft so that, if the potentiometer card is defective, it may be removed from the potentiometer and discarded without wasted effort which would be required to mount and dismantle the dial in the potentiometer.

An object of the invention is the provision of new and improved apparatus for testing articles.

Apparatus for testing potentiometers embodying the invention may include means for holding a potentiometer card of a potentiometer in a predetermined position, a member having a scale formed thereon, a pointer positioned adjacent to the member, means for connecting the scale member to a brush assembly of the potentiometer card for movement therewith, and testing means in circuit with the potentiometer card and the brush assembly for determining whether ratios of resistance of the potentiometer card obtained by various settings of the brush assembly on the potentiometer card fall within allowable limits.

One specific type of apparatus embodying the invention designed for testing potentiometers having at least one circular potentiometer card and a rotatable brush for engaging card, comprises a frame, means for supporting a potentiometer in the frame, a shaft carried by the frame in alignment with the shaft of the potentiometer, means for securing the two shafts together, a calibrated dial secured to the shaft supported by the frame, and a test set for making electrical measurements upon the potentiometer, whereby the resistance characteristics of various portions of the potentiometer card and the angular displacement thereof with respect to each other may be determined.

A complete understanding of the invention may be obtained from the following detailed description of apparatus for testing potentiometers forming specific embodiments thereof, when read in conjunction with the appended drawings, in which Fig. 1 is a top plan view of an apparatus for testing potentiometers forming one embodiment of the invention, with portions thereof broken away;

Fig. 2 is a fragmentary, vertical, partially sectional view of the apparatus;

Fig. 3 is a fragmentary, vertical section taken along line 3—3 of Fig. 1;

Fig. 4 is a diagrammatic view of an electrical circuit embodied in the apparatus;

Fig. 5 is an enlarged, fragmentary, vertical section taken along line 5—5 of Fig. 1;

Fig. 6 is a fragmentary, vertical section of an apparatus forming an alternative embodiment of the invention, and Fig. 7 is a horizontal section taken along line 7—7 of Fig. 6.

Figure 1:
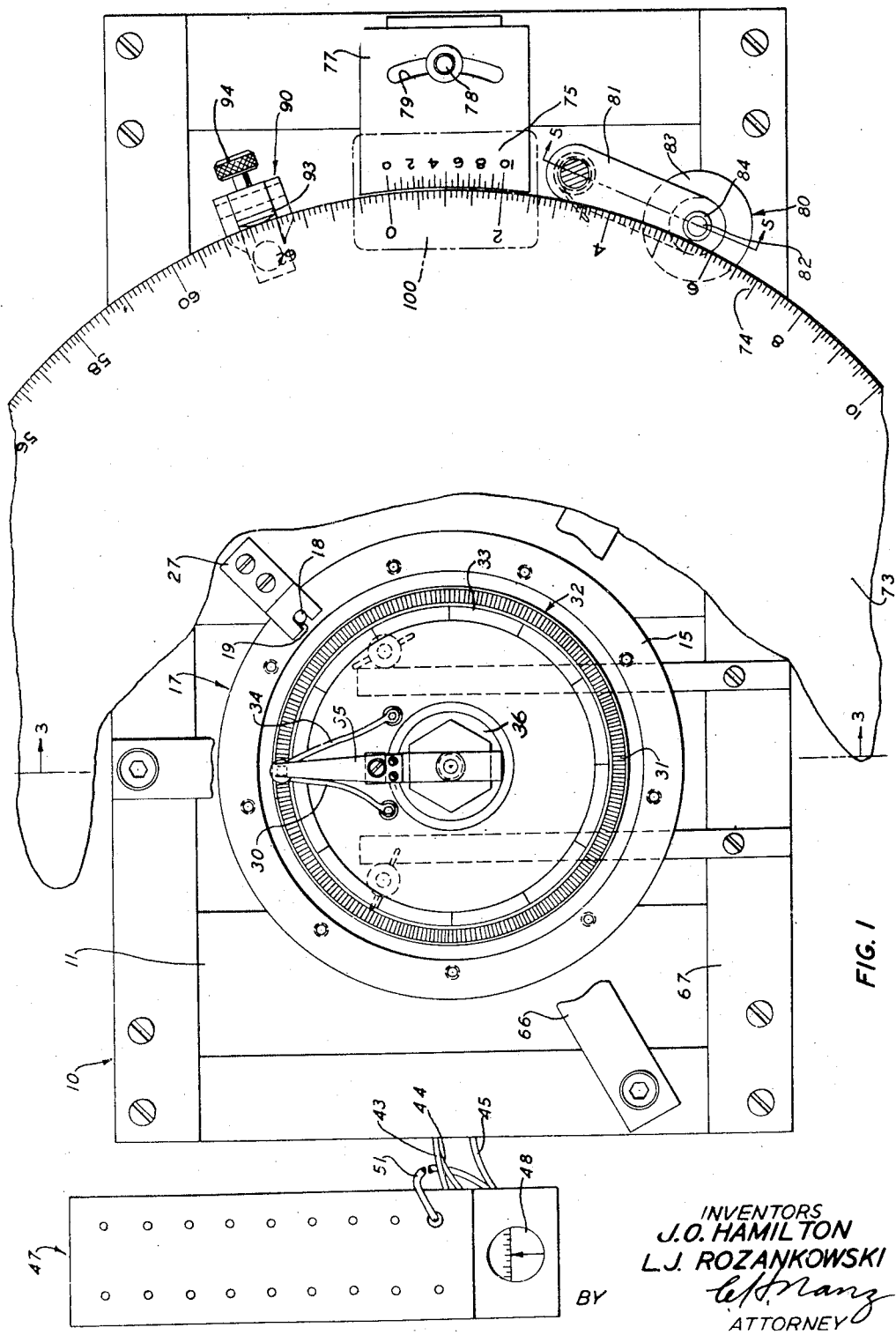

Referring now in detail to the drawings, a testing fixture 10 (Figs. 1 and 2) includes a table 11 having a table-top 13 made of wood or other suitable electrical insulating material and provided with bores 16—16 through which thumbscrews 12—12 project. The thumbscrews may be threaded into tapped bores 14—14 formed in a base 15 of a potentiometer 17 to be tested to secure the base in an orientated position upon the table-top 13. A pin 18 secured to the base at a predetermined point thereon fits into a notch 19 formed in a bracket 27 bolted to the table-top. The bracket is provided with a relieved portion 28 to permit the base to be slid under the end of the block so that the pin fits into the block.

Terminal posts 20, 21 and 22 on the potentiometer project downwardly, as viewed in Fig. 2, from the base 15 and are engaged by resilient contactors 24, 25 and 26, respectively, secured upon the table-top 13. The potentiometer 17 is provided with an annular projection 33 upon which a ring-shaped potentiometer card 32 is mounted. The potentiometer card 32 comprises a resistance wire 31 wound helically around a ring 29 of insulating material and a lead 30 connects the zero end of the resistance wire to the terminal post 20. A lead 34 connected to the unity end of the resistance wire 31 is connected to the terminal post 21.

A brush assembly 35 of the potentiometer 17 is mounted on a disc 36 which is rigidly secured to a shaft 40 of the potentiometer. The shaft 40 is rotatably mounted upon the base 15 in a position in which the shaft 40 is concentric with the potentiometer card 32 and may be turned to slide the brush assembly along the resistance wire 31. A brush assembly 39 connects the brush assembly 35 to a slip ring 41, which is mounted rigidly upon the base 15 and is insulated therefrom. A lead 42 connects the slip ring 41 to the terminal post 22.

The resilient contactors 24, 25 and 26 are connected to one end of a resistance 46 of a test set 47, the opposite end of the resistance 46 and a galvanometer 48, respectively, by conductors 43, 44 and 45, respectively. A conductor 53 connects the conductor 44 and the end of the resistance 46 to a source 50 of electrical potential, which is connected to the opposite end of the resistance 46 and the conductor 43 by conductors 54 and 56 and a manually operable switch 55 positioned therebetween. A contactor 52, which may be adjusted to contact the resistance 46 at different points thereon, is connected by a conductor 51 to the galvanometer 48.

The test set 47 serves to test the ratios of resistance of various portions of the resistance wire 31 with respect to the resistance of the whole of the resistance wire 31 by adjusting the contactor 52 along the resistance 46 and the contact and moving successively the brush assembly 35 through predetermined angles along the resistance wire 31. When the ratio of resistance of the portion of the resistance 46 between the contactor 52 and the lower end of the resistance 46 with respect to the resistance of the entire resistance 46 is equal to the ratio of resistance of the portion of the resistance wire 31 between the zero end thereof and the brush assembly 35 with respect to the resistance of the entire resistance wire 31, no current passes through the galvanometer 48. However, if these ratios are unequal, current passes through the galvanometer 48 which indicates that condition.

A chuck 63 (Figs. 2 and 3) is splined to a shaft 64 rotatably mounted in a bearing 65 formed in a spider 66. The spider 66 is carried by posts 70—70 in a position spaced above the table-top 11. A bore 67 formed in one end of the chuck receives the shaft 64, and a set screw 71 may be tightened to fasten the chuck rigidly to the shaft 64. A bore 68 formed in the other end of the chuck receives the shaft 40 of the potentiometer, and a set screw 72 may be actuated to connect the chuck rigidly to the shaft 40. In securing the potentiometer to the table-top 13, the pin 18 is slid into the notch 19 formed in the bracket 27 and the base 15 is moved to a position in which the shaft 40 is in alignment with the chuck. The chuck then is slid over the shaft 40 so that the base is secured to the fixture in an orientated position in which the thumbscrews 12—12 may be threaded into the tapped bores 14—14 formed in the base.

A dial 73 of a large diameter has a scale 74 (Fig. 1) formed adjacent to the periphery thereof and is rigidly fastened to the shaft 64. A vernier 75 is formed on a plate 77 secured by a thumbscrew 78 to a post 76 (Fig. 2) in a position adjacent to the periphery of the dial 73. The thumbscrew 78 passes through an arcuate slot 79 formed in the plate 77, and may be loosened to permit angular adjustment of the plate 77 and the vernier with respect to the dial.

A micrometer adjustment device 80 (Figs. 1 and 5) includes a spring-biased arm 81 mounting a shaft 82 having a knurled disc fastened thereto. A friction sleeve 84 mounted on the upper end of the shaft 82 normally is held away from the periphery of the dial 73 by the spring-biased arm 81. When the arm 81 is pressed manually toward the dial 73 and the knurled disc 83 is rotated, the shaft 82 and the friction sleeve 84 are rotated and the friction sleeve rotates the dial 73 and the shaft 64 slowly.

The dial 73 may be secured against rotation by a clamp 90 (Figs. 1 and 2). The clamp 90 includes a lever 91 pivotally mounted on a frame 92 and having a clamp button 93 positioned thereon adjacent to one end. A thumbscrew 94 threaded into a tapped bore 97 formed in the other end of the lever is designed to press against an abutment 95 of the frame 92 and pivot the lever 91 in a counterclockwise direction, as viewed in Fig. 2, so as to press the clamp button 93 against the periphery of the dial 73 to hold the dial against rotation. A button 96 positioned on the frame 92 serves to support the dial 73. The dial 73 may be released for turning movement thereof, simply by unscrewing the thumbscrew 94, which permits a leaf spring 98 to press the end of the lever bearing the clamp button away from the dial. A magnifying lens 100 is supported by a post 101 in a position from which the reading of the vernier 75 on the scale 74 may be read through the magnifying lens.

In the operation of the testing fixture 10, the set screw 71 is loosened, the chuck 63 is slid upwardly, as viewed in Fig. 2, upon the shaft 64, and the set screw 71 is tightened to secure the chuck on the shaft 64 in that position. The potentiometer 17 is placed on the table-top 13, the pin 18 is slid into the notch 19 formed in the bracket 27 and the base 15 is pivoted about the pin until the shaft 40 is directly under the bore 68 formed in the chuck. The set screw 71 then is loosened, the chuck is slid over the shaft 40, and the set screw 71 again is tightened to secure the chuck to the shaft 64. The chuck and the bracket now hold the potentiometer in a position in which the thumbscrews 12—12 may be threaded into the tapped bores 14—14 formed in the base, and the terminal posts 20, 21 and 22 are contacted by contactors 24, 25 and 26, respectively. This connects the brush assembly 35 and the ends of the resistance wire 31 to the test set 47. The thumbscrews 12—12 then are screwed into the tapped bores, whereby the potentiometer is secured to the table-top in an orientated position with respect thereto.

The dial 73 then is rotated to a position in which the vernier 75 reads approximately zero, and the clamp 90 is actuated to secure the dial in this position. The brush assembly 35 then is moved to the zero end of the resistance wire 30 by rotating the shaft 40 and the switch 55 is closed to energize the test set 47 to aid in locating the brush assembly 35 on the zero end of the resistance wire. After the brush 35 is so located, and the set screw 72 is tightened to secure the shaft 40 securely to the chuck 63 whereby the dial 73 and the brush 35 are connected for identical rotative movement around the axes of the shafts 64 and 40, which axes are aligned.

The thumbscrew 78 is loosened and the plate 77 is adjusted with respect to the dial 73 to a position in which the vernier 75 reads exactly zero on the dial. The thumbscrew 78 then is tightened to fasten the plate 77 in this position in which the vernier is calibrated with respect to the dial.

The dial 73 then is rotated through a predetermined angle to a position in which the vernier 75 has a predetermined reading on the scale 74 (Fig. 1) formed on the dial. The brush assembly 35 rotates through a corresponding angle with that through which the dial 73 is rotated, and the contactor 52 is adjusted along the resistance 46 (Fig. 4) to a position which should correspond to the reading of the vernier 75 on the scale 74. The switch 55 (Fig. 4) then is closed and the ratio of the resistance of the portion of the resistance wire 31 between the zero end thereof and the brush assembly 35 with respect to the entire resistance of the resistance wire then is checked to see whether it corresponds with the ratio which should be obtained from the particular setting of the brush assembly 35 and the dial 73.

The dial 73 is rotated successively through predetermined angles and the test set is adjusted to check the resistance ratios for the several settings of the dial.

If the ratios of the resistance wire 31 are found to be within predetermined allowable limits, the potentiometer 17 may be removed from the fixture 10 and a dial (not shown) may be attached to the shaft 40 to complete the assembly of the potentiometer 17. However, if the ratios of the resistance wire 31 are not within the allowable limits, the potentiometer card 32 may be removed from the potentiometer 17 before the work in assembling the dial of the potentiometer has been performed. Thus, a large saving in time required for assembling the potentiometers may be effected. The dial 73, which has a large diameter, the vernier 75 and the magnifying lens 100 permit the ratios of the resistance wire 31 to be read within very close limits. The bracket 27 and the chuck 73 enable an operator to quickly orient the potentiometer with respect to the fixture so that the potentiometer may be fastened thereto with no wasted effort.

A testing fixture 110 (Figs. 6 and 7) forming an alternative embodiment of the invention includes a base 111 supporting a bearing 165, which rotatably and slidably mounts a shaft 164 therein. A collar 121 formed on the shaft 164 ordinarily rests on a shoulder 122 formed on the bearing 165. A dial 173 similar to the dial 73 (Fig. 1) and a disc 174 (Fig. 6) are fastened to the upper end of the shaft 164. A vernier 175 is positioned adjacent to the periphery of the dial 173, and a magnifying glass 200 is positioned over the vernier 175.

A member 123 fastened to the top of the dial 173 concentrically therewith has a socket 124 formed therein in which socket a split chuck 163 is mounted. A thumbscrew 172 threaded into a tapped bore 125 formed in the member 123 is designed to close the split chuck over the end of a shaft 140 of a potentiometer 117 so that the split chuck 163 and the shaft 140 are held concentrically against rotation relative to the member 123 and the dial 173.

A collar 126 having a frustoconical bearing surface 127 formed thereon is fastened to the upper end of the shaft 140. A clearance bushing 128 having a frustoconical surface 129 formed thereon mounts the shaft 140 rotatably. The bearing surface 129 is complementary to the bearing surface 127, and centers the collar 126 and the shaft 140 when the bearing surface 127 is pressed thereagainst. The bushing 128 is supported by a bearing 130 formed on a base 115 of the potentiometer 117. The potentiometer 117 includes a potentiometer card 132 and a brush assembly 135, and is connected to a test set (not shown) similar to the test set 50 by suitable means (not shown).

Arms 141—141 having semicylindrical portions 142—142 forming a clamping collar are clamped by a bolt 143 tightly to the bearing 165. Arms illustrated by an arm 151 are clamped by a bolt 153 to the bearing 165, and have a yoke 154 hinged thereto by a pin 155.

Rollers 156—156 are rotatably mounted on arms 157—157 of the yoke 154, and a cam follower 158 is mounted in a slot 159 formed in the stem of the yoke. An eccentric cam 166 fastened to a crank 167 having a handle 168 is rotatably mounted in slots 169—169 formed in the ends of arms 141—141. The cam 166 has a lobe 170 and a depression 171 formed thereon. When the cam 166 is rotated in a clockwise direction, as viewed in Fig. 6, the lobe 170 is rotated into engagement with the cam follower 158 and turns the yoke 154 in a counterclockwise direction, whereby the rollers 156—156 raise the disc 174, the dial 173, the shaft 164, the member 123 and the split chuck 163 from their full-line positions, as viewed in Fig. 6, to their broken-line positions.

The base 115 of the potentiometer 117 is supported in a stationary position by a support 112 mounted against movement on a channel 114, to which support the base is clamped by thumbscrews, illustrated by a thumbscrew 113. Thus, when the split chuck 163 is raised, as described hereinabove, it slides upwardly on the shaft 140. The set screw 172 then is actuated to clamp the chuck 163 on the shaft 140, and the cam 166 is turned to move the lobe 170 out of engagement with the cam follower 158. The yoke 154 then turns by gravity in a clockwise direction, as viewed in Fig. 6, and the weight of the shaft 164, the disc 174, the dial 173, the member 123 and the chuck 163 is borne by the shaft 140. This pulls the frustoconical bearing surface 127 against the complementary bearing surface 129 so that the shaft 140 is centered with respect to the clearance bushing 128 and the base of the potentiometer. The brush assembly 135 and the shaft 140 then may be rotated with respect to the base 115 of the potentiometer and the dial 173 rotates therewith.

In the operation of the testing fixture 110, the base 115 of the potentiometer 117 is placed upon the support 112, and is clamped thereon by the thumbscrews illustrated by the thumbscrew 113. The dial 173 is moved approximately to zero with respect to the vernier 175 and the brush assembly 135 is positioned in engagement with the zero end of the resistance card 132, a test set (not shown) similar to the test set 35 (Fig. 1) being used to check the position of the brush assembly 135 (Fig. 6) on the potentiometer card 132. The crank 167 is turned from its full-line position to its broken-line position, and the dial 173, the shaft 164, the member 123 and the split chuck 163 are raised by the yoke 154, which is turned by the cam 166.

The chuck 163 then is tightened on the shaft 140 by the thumbscrew 172 and the crank 167 is turned to its full-line position leaving the chuck 163, the member 123, the dial 173, the disc 174 and the shaft 164 suspended from the shaft 140. The vernier 175 then is adjusted to read zero on the dial 173, and the potentiometer card 132 then is tested by a test set (not shown) similar to the test set 35 (Fig. 1) in a manner similar to that in which the potentiometer card 32 is tested, except that the shaft 140 (Fig. 6) is urged downwardly by the weight of the elements fastened thereto.

The testing fixture 110 tests the potentiometer 117 while maintaining the bearing surface 127 against the bearing surface 129 throughout so that the shaft is centered in the clearance bearing 128 and the base 115.

What is claimed is:

1. A fixture for testing potentiometers, which comprises a support, a plurality of contactors positioned on the support, a bracket having a notch formed therein and mounted in a predetermined position with respect to the support for receiving in said notch an element secured to a base of a potentiometer, and a chuck having a socket formed therein for receiving a second element secured to the base of the potentiometer, said chuck being mounted for sliding movement over such a point on the support that the bracket and the chuck hold the potentiometer on the support in a position in which a plurality of terminal posts projecting from the base of the potentiometer are in contact with the contactors.

2. In a fixture for testing a resistance wire of an annular potentiometer card of a potentiometer having a base provided with a cylindrical projection for supporting the annular potentiometer card, a shaft rotatably mounted on the base, a brush assembly carried by the shaft for slidably engaging the resistance wire and a plurality of terminal posts projecting from the bottom of the base and connected electrically with the ends of the resistance wire and the brush assembly, the improvement which comprises a base plate, means for clamping the base to the base plate, a plurality of contactors positioned on the base plate for engaging the terminal posts, a dial rotatable with respect to the base plate, a stationary pointer past which the dial may be rotated, and means for clamping the potentiometer shaft to the dial.

3. A fixture for testing a resistance wire of an annular potentiometer card of a potentiometer having a base provided with a cylindrical projection for supporting the annular potentiometer card, a shaft rotatably mounted on the base, a brush assembly carried by the shaft for slidably engaging the resistance wire and the brush assembly and a plurality of terminal posts projecting from the bottom of the base and connected electrically with the ends of the resistance wire and the brush assembly, which fixture comprises a base plate, quick-detachable means for clamping the base to the base plate, a plurality of contactors positioned on the base plate for engaging the terminal posts, a dial rotatable with respect to the base plate, a stationary pointer past which the dial may be rotated, quick-detachable means for clamping the shaft to the dial, and means for temporarily clamping the dial against rotation so that the brush assembly is temporarily held against rotation.

4. In a testing apparatus including a test set for testing a resistance wire of an annular potentiometer card of a potentiometer having a base provided with a cylindrical projection for supporting the annular potentiometer card, a shaft rotatably mounted on the base, a brush assembly carried by the shaft for slidably engaging the resistance wire and a plurality of terminal posts projecting from the bottom of the base and connected electrically with the ends of the resistance wire and the brush assembly, a fixture which comprises a base plate, a plurality of contactors mounted on the base plate, means for securing the base of the potentiometer to the base plate in a position in which the terminal posts of the potentiometer are in engagement with the contactors, a dial, a shaft positioned in alignment with the shaft of the potentiometer and connected to the dial, a stationary pointer positioned at the edge of the dial, a chuck slidably mounted on the shaft, means for securing the chuck to the dial-supporting shaft in a predetermined position with respect thereto, and means for securing the chuck to the shaft of the potentiometer.

5. In a testing apparatus including a test set for testing a resistance wire of an annular potentiometer card of a potentiometer having a base provided with a cylindrical projection for supporting the annular potentiometer card, a rotatable brush assembly carried by the shaft for slidably engaging the resistance wire and a plurality of terminal posts projecting from the bottom of the base and connected electrically with the ends of the resistance wire and the brush assembly, a fixture which comprises a base plate, a plurality of contactors mounted on the base plate, and means for securing the base of the potentiometer to the base plate in a position in which the terminal posts of the potentiometer are in engagement with the contactors.

6. In a testing apparatus including a test set for testing a resistance wire of an annular potentiometer card of a potentiometer having a base for supporting the potentiometer card, a pin projecting from the base, a shaft rotatably mounted on the base, a brush assembly carried by the shaft for slidably engaging the resistance wire and a plurality of terminal posts projecting from the bottom of the base and connected electrically with the ends of the resistance wire and the brush assembly, a fixture which comprises a support, a plurality of contactors positioned on the support, a bracket secured to the support in a predetermined position thereon and provided with a notch for receiving the pin projecting from the base of the potentiometer, a plurality of thumbscrews for securing the base of the potentiometer to the support in a position in which the terminal posts of the potentiometer are engaged by the contactors, a large dial, a shaft rigidly fastened to the dial for mounting it rotatably, means for mounting the dial-mounting shaft in alignment with the shaft of the potentiometer, a double-ended chuck mounted slidably on the dial-supporting shaft, means for securing the shaft of the potentiometer to the chuck to orient the potentiometer on the support in cooperation with the bracket, an adjustable vernier associated with the dial, and means for temporarily holding the dial against movement relative to the vernier, whereby the brush assembly is held against rotation relative to the resistance wire.

7. In a testing apparatus including a test set for testing a resistance wire of an annular potentiometer card of a potentiometer having a base for supporting the potentiometer card, a pin projecting from the base, a shaft rotatably mounted on the base and a brush assembly carried by the shaft for slidably engaging the resistance wire, a fixture which comprises a support, a bracket secured to the support in a predetermined position thereon and provided with a notch for receiving the pin projecting from the base of the potentiometer, a large dial, a shaft rigidly fastened to the dial for mounting it rotatably, means for supporting the shaft rotatably, a double-ended chuck mounted slidably on the dial-mounting shaft, and means for securing the chuck to the shaft of the potentiometer to locate, in cooperation with the bracket, the potentiometer in a predetermined position in the fixture.

8. In a testing apparatus including a test set for testing a resistance wire of an annular potentiometer card of a potentiometer having a base provided with a pin, a shaft rotatably mounted on the base and a brush assembly carried by the shaft for slidably engaging the resistance wire, a fixture which comprises a support, a block secured to the support in a predetermined position thereon and provided with a notch for receiving the pin projecting from the base of the potentiometer, a dial, a shaft rigidly fastened to the dial for mounting it rotatably, means for mounting the dial-mounting shaft for rotation, a double-ended chuck mounted slidably on the dial-mounting shaft, means for securing the chuck to the shaft of the potentiometer to locate, in cooperation with the bracket, the potentiometer in a predetermined position on the support, and a plurality of thumbscrews for securing the base of the potentiometer to the support in that position.

JAMES O. HAMILTON.
LEON J. ROZANKOWSKI.

REFERENCES CITED

The following references are of record in the file of this patent:

UNITED STATES PATENTS

| Number | Name | Date |
| --- | --- | --- |
| 1,808,777 | Jones | June 9, 1931 |
| 1,846,153 | Sherman | Feb. 23, 1932 |
| 1,870,462 | McWeeny | Aug. 9, 1932 |
| 1,966,066 | Haskins | July 10, 1934 |
| 2,052,688 | Allen | Sept. 1, 1936 |
| 2,390,840 | Koren | Dec. 11, 1945 |